United States Patent [19]
Lescrenier

[11] 3,861,807
[45] Jan. 21, 1975

[54] POSITION LOCATING AND MAINTAINING METHOD AND MEANS

[76] Inventor: Charles Lescrenier, 660 Crescent Ct., Wauwatosa, Wis. 53213

[22] Filed: Aug. 17, 1972

[21] Appl. No.: 281,521

[52] U.S. Cl. .................................. 356/152, 250/446
[51] Int. Cl. ............................................ G01b 11/26
[58] Field of Search ............ 356/152; 250/442, 446, 250/447

[56] References Cited
UNITED STATES PATENTS
3,558,231  1/1971  Bakel .................................. 356/152
3,723,744  3/1973  Lim et al. ........................... 356/152

*Primary Examiner*—Maynard R. Wilbur
*Assistant Examiner*—S. C. Buczinski
*Attorney, Agent, or Firm*—Andrus, Sceales, Starke & Sawall

[57] ABSTRACT

A locating technique employs a beam of concentrically patterned, varying intensity light to position one object, for example a hospital patient, with respect to a second object, such as a radiation beam emitter. The pattern of light is oriented with respect to the radiation beam and a reflective target is placed on the skin of the patient for providing a reflected light signal to a light sensor. The light sensor is connected to control means for moving a patient-containing bed into the center of the light beam and, hence, into the desired position with respect to the radiation beam.

51 Claims, 10 Drawing Figures

PATENTED JAN 21 1975

POSITION LOCATING AND MAINTAINING METHOD AND MEANS

BACKGROUND OF THE INVENTION

1. Field of the Invention

The present invention relates to a technique for establishing and maintaining a locational relationship between two objects, at least one of the objects being relatively movable with respect to the other. The invention may find utility in radiation therapy in positioning a patient with respect to a beam of radiation. In addition to properly positioning the patient initially, the present invention maintains the patient in the proper position with respect to the radiation beam.

2. Description of the Prior Art

In radiation therapy, a beam of high energy radiation is established from a radiation source such as cobalt 60 or a linear accelerator. A patient is placed on a bed and the portion of the patient to be treated placed in the beam for a predetermined exposure time. The irradiation of the patient destroys cellular tissue or inhibits its growth to achieve the desired theraputic benefits.

As can be readily appreciated, the radiation beam must be accurately positioned with respect to the portion of the patient being treated to both insure the maximum therapy and to prevent undesirable damage to healthy tissue.

Such positioning has been achieved in the past by painting a target on the patient's skin over the area to be radiated. A light pattern, for example an X, is provided along the path of the radiation beam and the patient's bed is moved so that the target on the skin is aligned with the lighted pattern. The lighted pattern is then removed, and the area around the patient evacuated of personnel and the radiation beam established.

Although the initial position of the patient with respect to the radiation beam source is correct, frequently the patient shifts position during treatment so that the beam is no longer applied to the desired portion of the patient. The patient may be unable to detect this because his view is blocked by dressings and the like, and because the radiation beam is not visible to the naked eye. Attending technicians cannot detect misalignment of the patient with respect to the radiation beam because of their absence from the bedside to prevent accidental irradiation. The result is that radiation therapy is often less effective than it should be because of misalignment of the portion of the patient to be treated with the beam. While longer exposure times and higher beam energies may overcome this to some extent, there is a corresponding deleterious effect on the patient.

Hence, there has developed a need for a means to indicate when a radiation therapy patient is properly positioned with respect to the radiation beam. Prior art work in this area has generally been directed to indicators which indicate misalignment and stop the radiation beam when this occurs. With these devices, the radiation beam source is disarmed, the patient repositioned, and the radiation beam reapplied to continue the therapy. This consumes considerable time with the resulting discomfort of the patient.

SUMMARY OF THE PRESENT INVENTION

It is, therefore, the object of the present invention to provide a means and method for establishing a locational relationship between two objects and for restoring and maintaining this relationship in the event of an alteration in the location of one of the objects.

More specifically, it is the object of the present invention to provide a means and method for establishing patient-radiation beam alignment and for restoring and maintaining this relationship in the event the patient alters his position.

Briefly, the present invention utilizes a beam of concentrically patterned light having a varying intensity from the center to the extremeties thereof. A reflecting target is placed on the patient or other object for reflecting the beam of concentrically patterned light. The reflected light is sensed to derive a signal proportional to its intensity. This signal is utilized to operate control means to indicate the relationship of the patient or other object with respect to the light beam and to restore and maintain a desired relationship.

DESCRIPTION OF THE PREFERRED EMBODIMENT

Figure 1:
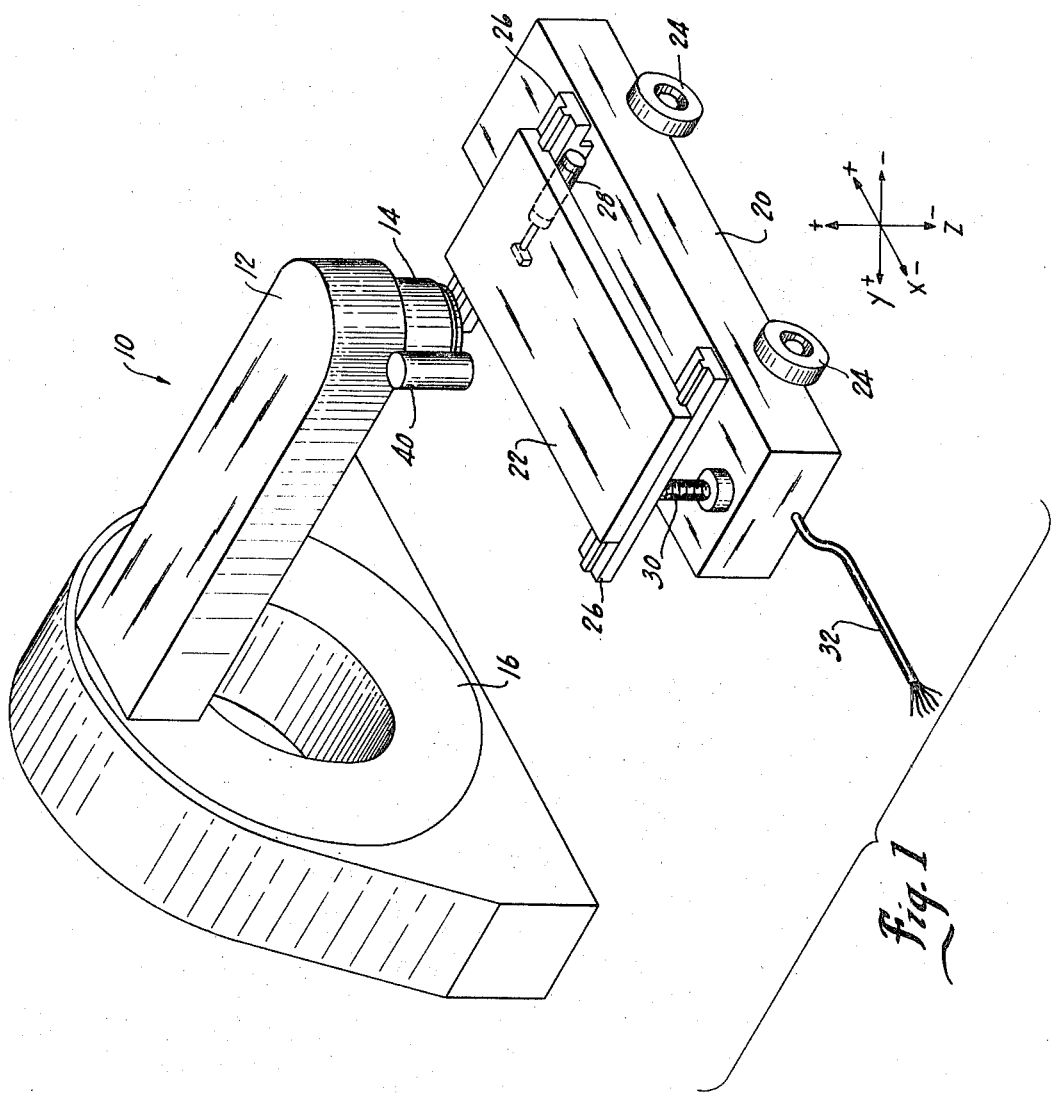
FIG. 1 is a perspective view of a radiation beam source and movable, patient receiving bed with which the present invention may be employed.

In FIG. 1 there is shown a typical embodiment of the device of the present invention as a means for positioning a patient with respect to a radiation beam.

The radiation beam is generated by any commonly used source, a magnetic induction electron accelerator 10 being typically shown in FIG. 1. Accelerator 10 includes arm 12 which supports head 14 for emitting radiation. Arm 12 is arcuately movable with drum 16 so as to apply the beam with a desired degree of obliqueness. Head 14 is rotatable, also to assist in directing the radiation beam.

The patient is positioned on bed 20 in the path of the radiation. Bed 20 includes couch 22 for receiving the patient. Couch 22 is movable in three mutually perpendicular axes, hereinafter termed the X axis, Y axis, and the Z axis. As shown in FIG. 1, motion of couch 22 back and forth in front of drum 16 is considered to be motion along an X axis. Motion of couch 22 toward and away from drum 16 is considered to be motion along the Y axis and motion of the couch 22 up and down is considered motion along the Z axis. For purposes of the subsequent explanation, the direction of motion along the axes is considered in terms of + and − directions. For example, motion of couch 22 along the Y axis toward drum 16 may be considered to be in the Y axis + direction while motion of couch 22 away from drum 16 is in the Y axis − direction.

Bed 20 includes motor driven wheels 24 for moving the bed back and forth along the X axis. Couch 22 may be mounted on bed 20 on ways 26 parallel to the Y axis and movement of the couch obtained by electric motor-lead screw mechanism 28. Ways 26 are vertically movable on bed 20 by motor driven lead screw 30 to move couch 22 up and down along the Z axis. The electric motor drives are powered by connection to power cable 32.

Figure 2:
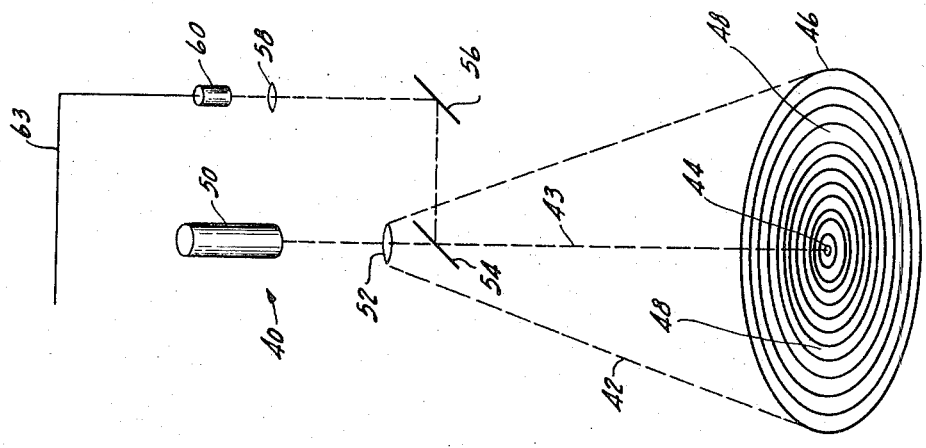
FIG. 2 is a diagrammatic view of portions of the position locator of the present invention.

A light source 40 is provided for generating a beam of concentrically patterned light having a varying intensity from the center thereof to the extremeties. This light source may be mounted on head 14 to project a beam of light generally along the course of the radiation. For example, and as shown in detail in FIG. 2, the beam of light 42 is most intense at center 44 and least intense at periphery 46. In the alternative, the beam of light 42 may be most intense at the periphery and the least intense at the center. The intervening area 48 between center 44 and periphery 46 is one of gradually diminishing intensity. The pattern of light in the intervening area may vary in accordance with some predetermined function as the area is radially traversed. For example, the light may vary uniformly or logarithmically across area 48.

Light source 40 may include laser 50 or some other appropriate source of radiant energy, such as visible or infrared light. The term "light" is used in the specification and in the claims as including all suitable types of radiant energy. The light produced by laser 50 is passed through diffusing lens 52 which creates the concentrically patterned varying intensity light beam 42 along axis 43. The light from lens 52 passes through the back of two way mirror 54 set on a 45° angle to the projection of the light.

As will be noted hereinafter, light is reflected back along axis 43 during the positioning of the patient. The reflected light is caught by two way mirror 54 and reflected onto a second mirror 56. The reflected image passes through a concentrating lens 58 onto photoelectric cell 60. Photoelectric cell 60 provides an electric signal proportional to the intensity of the reflected light in conductor 63.

Figure 3:
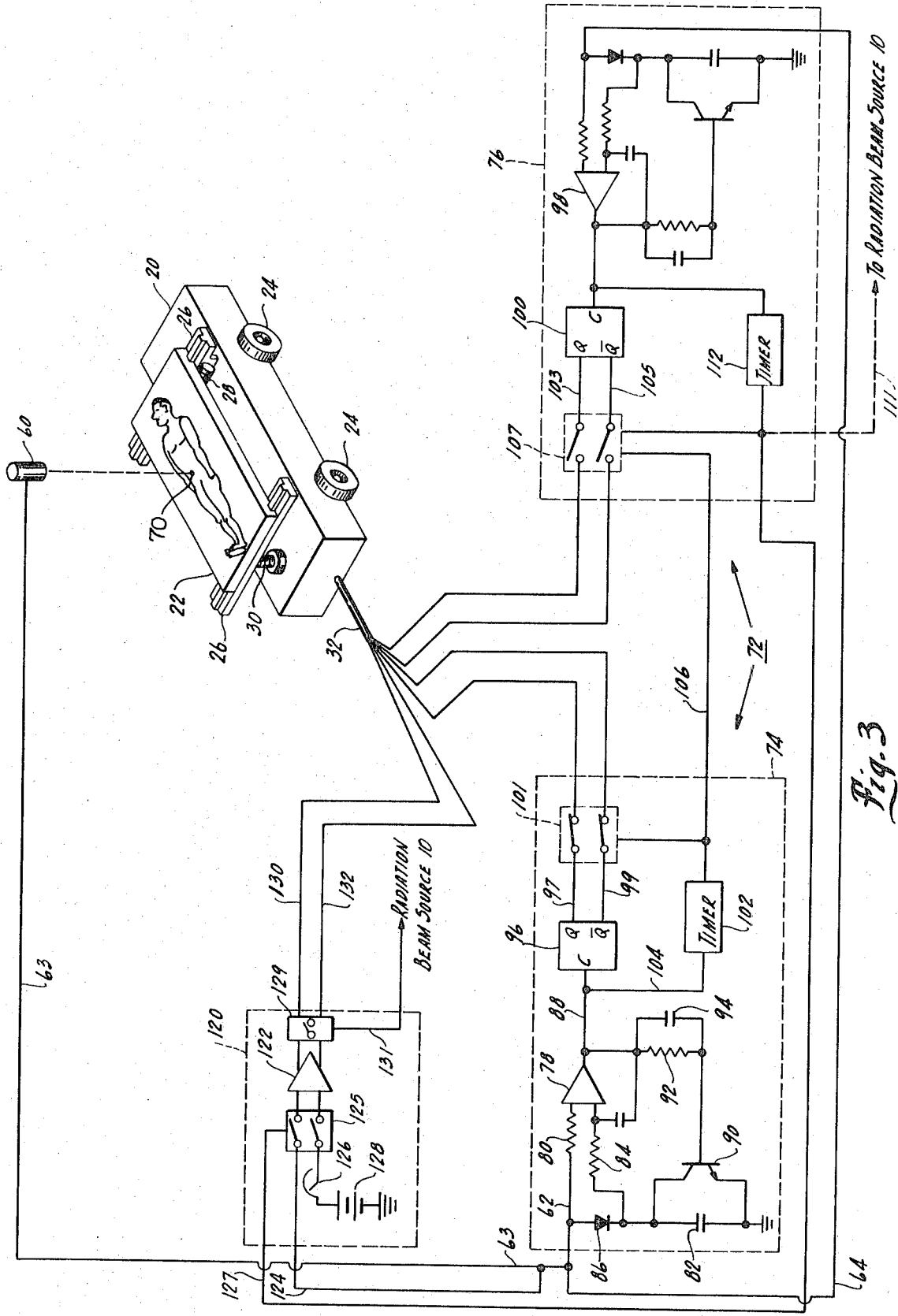
FIG. 3 is a schematic diagram of additional portions of the position locator of the present invention.

A reflective target 70 is placed on the skin of the patient at the area to be radiated, as shown in FIG. 3. This target is typically a small piece of tape of the retroreflective type which reflects incident light falling thereon back along the axis of the incident light. The photoelectric scanning tape manufactured and sold by the 3M Co., St. Paul, Minnesota, as stock No. 7900 is suitable for this purpose.

Photoelectric cell 60 is connected by means of conductor 63 to a control means 72 interposed between the photoelectric cell and the drive means for bed 20. As shown in FIG. 3, control means 72 includes an X axis control circuit 74 and a Y axis control circuit 76. X axis control circuit 74 and Y axis control circuit 76 are generally similar construction, and for convenience, only X axis control circuit 74 will be described in detail. X axis control circuit 74 includes an amplifier 78. Amplifier 78 may be of the differential type in that it is operable by the signal difference impressed on two input terminals. Photoelectric cell 60 is connected to one input terminal of differential amplifier 78 by means of conductors 63 and 62 and resistor 80. The upper plate of capacitor 82 is connected to the other input terminal of differential amplifier 78 through resistor 84. The lower plate of capacitor 82 is grounded. A diode 86 is connected across the input of amplifier 78. The diode is poled to apply voltage from conductor 62 to capacitor 82. The output of differential amplifier 78 is provided in conductor 88.

A transistor 90 has its emitter and collector terminals connected across capacitor 82. The base terminal of transistor 90 is biased by the output signal in conductor 88 through resistor 92 and capacitor 94.

As hereinafter described, the output signal in conductor 88 is in pulse form and is applied to the input of complementing flip-flop 96. The set and reset outputs of flip-flop 96 provide the output of X axis control circuit 74. The set or Q output of flip-flop 96 is connected by conductor 97 and power cable 32 to the drive means for wheels 24 to move bed 20 in the positive direction along the X axis. The reset or $\overline{Q}$ output of flip-flop 96 is connected by conductor 99 and power cable 32 to the drive means for wheels 24 to move bed 20 in the negative direction along the X axis. Conductors 97 and 99 pass through timer operated switch 101.

Y axis control circuit 76 is constructed in a manner similar to X axis control circuit 74. The signal in conductors 63 and 64 is supplied as the input to differential amplifier 98. The output of differential amplifier 98 is provided through complementing flip-flop 100. The set output of flip-flop 100 is connected to the drive means for couch 26 to move the couch in the positive direction along the Y axis. This connection is obtained by conductor 103 and power cable 32. The reset output of flip-flop 100 is connected through conductor 105 and power cable 32 to the drive means for couch 26 to move couch 26 in the negative direction along the Y axis. Conductors 103 and 105 pass through timer operated switch 107.

For purposes hereinafter described, X axis control circuit 74 and Y axis control circuit 76 are interconnected by a pair of timers. Output conductor 88 of differential amplifier 78 is connected to the input of timer 102 by conductor 104. The output of timer 102 operates switch 101. The operation of timer 102 is such that when a pulse in conductor 88 is applied to the input of timer 102, the timer closes switch 101 and retains it closed until at least three pulses appear in conductor 88 within a predetermined timing interval. When this occurs, timer 102 opens switch 101. The output from timer 102 is also provided to switch 107 in Y axis control circuit 76 in conductor 106. When timer 102 opens switch 101, it closes switch 107. This action renders Y axis control circuit 76 operative.

Y axis control circuit 76 includes timer 112 similar to timer 102 of X axis control circuit 74. Timer 112 operates switch 107 interposed in conductor 103 and 105. In addition, the output of timer 112 is connected to radiation beam source 12 by conductor 111 to control the emission of radiation from that source.

The operation of the present invention is as follows. Reflective target 70 is placed on the patient at the location to be radiated. This may, for example, be the torso as shown in FIG. 3. The patient is then placed on couch 26. This may be at a location removed from radiation beam source 12. Light source 50 is turned on to provide the concentrically patterned variable intensity light beam 42 along the axis of the radiation beam. With the patient on couch 26 the technician operates the drive means for wheels 24 to move the bed into the beam of light. For this purpose, the drive means may be preprogrammed so as to move bed 20 into a fixed location, such as the center of the treatment area. This will place the patient within beam 42 of concentrically patterned light.

When this motion has been completed, control means 72 is rendered operative. In its initial operative condition, it may be assumed that a signal is being provided in conductor 97 through closed switch 101 from the set output of flip flop 96 of X axis control circuit 74. The drive means for wheels 24 moves bed 20 in the X axis positive direction. There is no signal in conductor 88 so that timer 102 is not operative. Switch 107 is open. No signals appear in either conductor 103 or conductor 105 from Y axis control circuit 79 so that Y axis control circuit 76 is rendered inoperative.

With the patient in beam 42, target 70 provides a reflection to light source 40. This reflection strikes mirrors 54 and 56 and applies light to photoelectric cell 60. Photoelectric cell 60 provides a signal in conductors 63 and 62 proportional to the intensity of the light striking target 70. The signal in conductor 62 is applied through resistor 80 to one input of amplifier 78. The signal is also applied through diode 86 to charge capacitor 82. As long as the drive means is moving bed 20 in a direction which causes the signal in conductor 62 to continually increase, i.e., toward the desired location the signal across resistor 80 will always exceed the signal applied across resistor 84 by capacitor 82. The output condition of operational amplifier 78 does not change and drive means 24 continues to drive in the same direction, i.e., in the positive direction along the X axis.

At some time, the reflected light from target 70 will reach a peak and become reduced in magnitude. The signal across resistor 80 becomes less than the signal across resistor 84. This causes an output signal to appear in conductor 88 from operational amplifier 78. The signal in conductor 88 when applied to flip-flop 96 supplies a signal to the reset output of the flip-flop and removes a signal from the set output. This causes the drive means to reverse direction and drive bed 20 in the negative direction along the X axis.

The output signal in conductor 88 turns on transistor 90, discharging capacitor 82 and removing the signal across resistor 84 and from the input of differential amplifier 78. The signal across resistor 80 again becomes larger than the signal across resistor 84, removing the output signal of differential amplifier 78 in conductor 88. The output signal in conductor 88 is thus in the form of a pulse.

As bed 20 drives in the negative direction along the X axis, at some time, the reflected light from target 70 will rise to a peak. The signal in conductor 63 charges capacitor 82 but remains greater than the capacitor voltage holding differential amplifier 78 off and preventing an output signal from appearing in conductor 88. When the reflected light from target 70 passes the peak and decreases in magnitude, differential amplifier 78 is operated, as described above, to provide another pulse in conductor 88 which reverses the direction of travel of bed 20.

The above described process continues until three pulses are provided from differential amplifier 78 to timer 102 within a predetermined time period, indicating movement of target 70 and the patient into proximity with the desired location. When this occurs timer 102 is operated opening switch 101 and closing switch 107. This stops movement of bed 20 along the X axis and commences operation of Y axis control circuit 76 to move bed 20 along the Y axis. In a manner analogous to that described in connection with X axis control circuit 74, Y axis control circuit 76 moves couch 26 toward the peak of light beam 42. When three pulses are provided from differential amplifier 98, timer 112 is operated to open switch 107 and disable control means 72. At this point control means 72 may provide a signal in conductor 111 to radiation beam source 12 to commence exposing the patient to the radiation.

Unless otherwise disturbed, bed 20 remains in the position to which it has been directed by control means 72. Should the patient, and hence target 70, move, a process similar to that described above in connection with the initial position of the patient occurs to reposition the patient in the desired location with respect to the radiation beam.

Control of the movement of couch 22 in the Z axis may be obtained in a variety of ways. Inasmuch as the level of varying intensity reflected light applied to photoelectric cell 60 is generally inversely proportional to the distance of target 70 from the photoelectric cell, the level of reflected light may be employed to control movement of couch 22 along the Z axis. For this purpose, a Z axis control circuit 120 is included in control 72. Z axis control circuit 120 includes control amplifier 122. One input to control amplifier 122 comprises the signal from photoelectric cell 60 in conductors 63 and 124. The other input is a reference signal generated by rheostat 126 biased by battery 128. Rheostat 126 is adjustable to provide a reference signal to control amplifier 122 equal in magnitude to the signal generated in conductor 124 by a light intensity level corresponding to the desired position of couch 22 along the Z axis. The input signals to control amplifier 122 pass through timer operated switch 125 which is connected to timer 112 by conductor 127. The outputs of control amplifier 122 in conductors 130 and 132 are connected to the drive means for lead screw 30 on bed 20 to move couch 22 up and down along the Z axis. A level detecting switch 129 is connected in conductors 130 and 132 for detecting a null condition in the output of control amplifier 122. Switch 129 is connected to radiation beam source 10 by conductor 131.

In operation, a control amplifier 122 acts to regulate the position of couch 22 to the desired location along the Z axis after completion of the operation of Y axis control circuit 76. This regulation is obtained by means of the reference and feedback signals supplied thereto by rheostat 126 and conductor 124. When the operation of Y axis control circuit 76 has been completed, timer 112 closes switch 125 providing the feedback signal in conductor 124 and the reference signal from rheostat 126 to control amplifier 122. In the event the magnitude of the signal in conductor 124 is less than that of the reference signal provided by rheostat 126, a signal is provided by control amplifier 122 in conductor 130 to the drive means for lead screw 30 to move couch 22 in the positive or upward direction along the Z axis along to increase the signal in conductor 124. When the magnitude of the signal in conductor 124 equals the signal supplied to control amplifier 122 by rheostat 126, the output signal in conductor 130 is removed and movement of couch 22 along the Z axis in the positive direction ceases. Switch 129 is operated to provide a signal in conductor 131 to radiation beam source 10 to commence exposing the patient to the radiation In the event the magnitude of the signal in conductor 124 is greater than that of the reference signal provided by rheostat 126, a signal from control amplifier 122 is provided in conductor 132 to the drive means for lead screw 30 to move couch 22 in the negative, or downward, direction along the Z axis to decrease the signal in conductor 124. When the signal in conductor 124 becomes equal in magnitude to the signal provided by rheostat 126 to control amplifier 122, the output signal in conductor 132 is removed and switch 129 operated.

Figure 4:
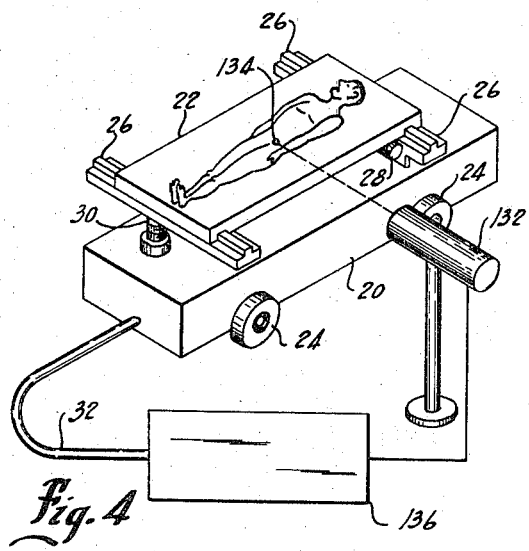
FIG. 4 is a diagrammatic view of a modification of the position locator of the present invention.

In the alternative, a second light source 132 similar in construction to light source 40, oriented in a horizontal plane, may be placed adjacent the patient and a second target 134 placed, for example, on the side of the patient as shown in FIG. 4. Light source 132 may be connected to a Z axis control circuit 136, similar in construction to X axis control circuit 74 or Y axis control circuit 76, to control the positioning of couch 22 along the Z axis. The positioning of couch 22 along the Z axis may also be used to correct any parallax existing between light source 40 and the radiation beam emitted from head 14.

Figure 5:
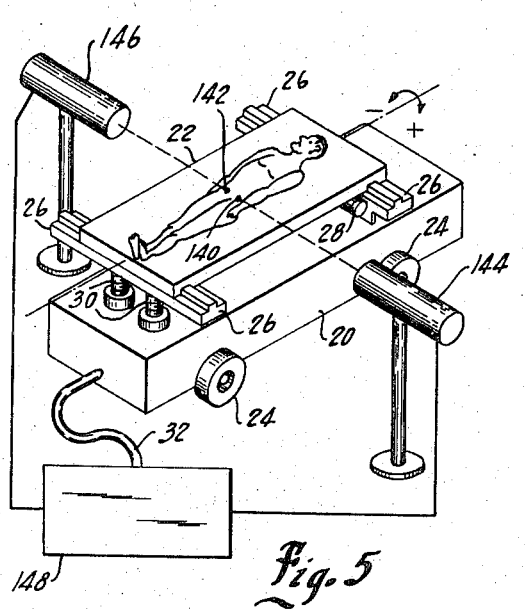
FIG. 5 is a diagrammatic view of another modification of the position locator of the present invention.

While the above material has described the invention as controlling the position of couch 22 to a desired location along three mutually perpendicular rectilinear axes, it will be appreciated that the angular position of couch 22 along each of three axes may also be controlled. For this purpose, the drive means for couch 22 is provided with means for rotating the couch about each of the three axes. To control the operation of these portions of the drive means, additional light sources are employed, as shown in FIG. 5. In FIG. 5, control of the angular position of couch 22 in its rotation above the X axis is shown and, as before, positive and negative directions of rotation are assumed for purposes of explanation.

A pair of targets 140 and 142 are provided on either side of the torso of the patient. Two light sources 144 and 146 are positioned on either side of couch 22 and aligned with targets 140 and 142 when the patient on couch 22 is located in the desired position. Light sources 144 and 146 are connected to a control circuitry 148, similar in construction to control means 72, shown in FIG. 3. Control circuit 148 is connected to the X axis angular drive means for couch 22 to control the positive and negative angular position in the couch in the same manner as control means 72, controls the rectilinear position of couch 22. Angular movement may be provided to couch 22 by mounting a pair of independently movable lead screw 30 to each of ways 26, as shown in FIG. 5.

Specifically, should the patient on couch 22 roll his torso, targets 140 and 142 will be moved out of alignment with light sources 144 and 146. The resulting changes in the outputs of light sources 144 and 146 will cause control circuit 148 to rotate couch 22 to bring targets 140 and 142 back into alignment with light sources 144 and 146 to reposition the patient with respect to the radiation beam. Similar devices and circuitry may be provided to control the angular movement of couch 22 about the Y and Z axis.

Figure 7:
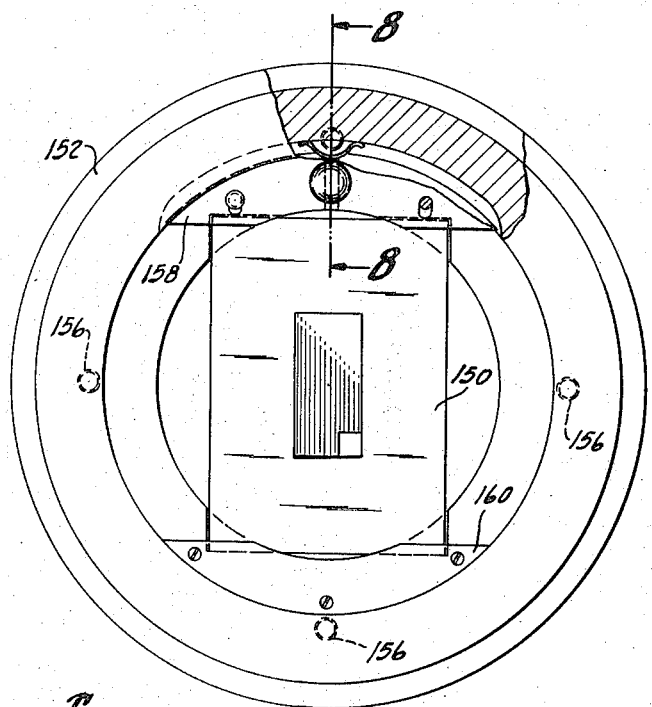
FIG. 7 is a plan view of the adaptor ring taken along the line 7—7 of FIG. 6.
Figure 8:
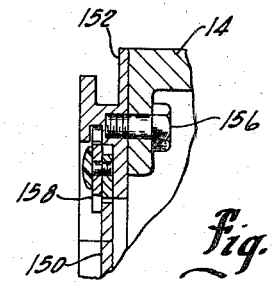
FIG. 8 is a cross sectional view of portions of the adaptor ring shown in FIGS. 6 and 7 taken along the line 8—8 of FIG. 7.
Figure 6:
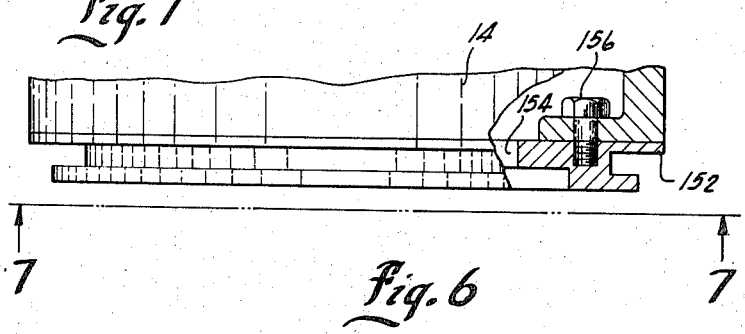
FIG. 6 is a partially cut away, elevational view of an adaptor ring being suitable for use with the radiation beam source employed with the present invention.

In addition to accurately positioning the patient, it is also necessary to accurately control the radiation beam in order to provide maximum theraputic benefits to the patient, while minimizing undesirable side effects. To this end, a means may be provided on radiation head 14 to assist in controlling the beam. As shown in FIG. 7, lead compensating block 150 positioned on mount 151 may be inserted in the path of the radiation beam issuing from head 14. Block 150 may form a wedge or other suitable shape. A ring 152 is mounted on head 14 near port 154 through which the radiation beam issues, as by bolts 156. See FIG. 6. Spring loaded plate 158 mounted in ring 152 serves to position compensating block mount 151 in ring 152. See FIG. 8. Retaining plate 160 retains the other end of mount 151 in ring 152. See FIG. 7. Compensating block mount 151 may be removed from ring 152 and replaced by depressing spring loaded plate 158, slipped out the old compensating block mount, slipping in the new compensating block mount, and allowing spring loaded plate 158 to resume its spring biased position.

Figure 9:
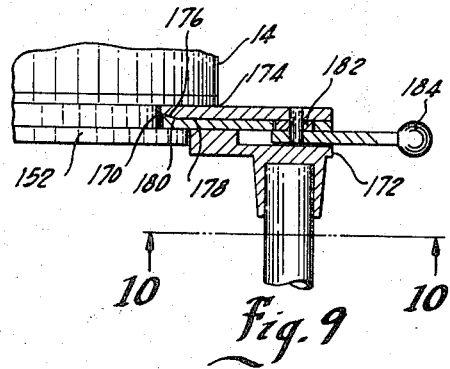
FIG. 9 is a cross sectional view of a means for connecting portions of the position locator of the present invention to the radiation beam source.
Figure 10:
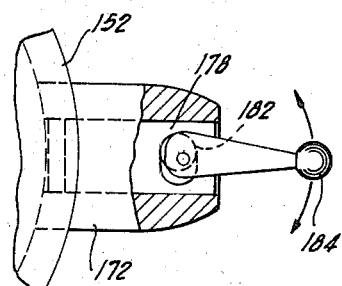
FIG. 10 is a partially cut away perspective view of the connection means taken along line 10—10 of FIG. 9.

Ring 152 may also be provided with means for rapidly and accurately affixing light source 40 to head 14 so as to permit the use of the patient position locator of the present invention. For this purpose, ring 152 is provided with a peripheral slot 170 about the annular surface thereof. See FIG. 9. A clamping member base 172 has a flange 174 which extends into slot 170. The center portion of clamping member base 172 is removed to form a groove, as shown in FIG. 10. A ramp like surface 176 is provided on the inner end of the groove. Locking member 178 is mounted in the groove of clamping member base 174 for radial movement therealong. Locking member 178 has a ramp like surface 180 which coacts with ramp surface 176, in the manner hereinafter described.

Means are provided on clamping member base 172 to radially move locking member 178. Such means may comprise a cam 182 rotatably mounted in clamping member base 174. Cam 182 engages a corresponding hole in locking member 178. Cam 182 is rotated by handle 184 to move locking member 178 in the groove. As locking member 178 is moved radially outward, the action of ramps 176 and 180 causes locking member 178 to jam clamping member base 174 in slot 170, thereby affixing clamping member base 172 on ring 152. Light source 40 may be mounted on clamping member base 172.

Various modes of carrying out the invention are contemplated as being within the scope of the following claims particularly pointing out and distinctly claiming the subject matter which is regarded as the invention.

1. A device for establishing the location of a first object with respect to a second object comprising:
light source means for generating a diffuse beam of concentrically patterned light bearing a predetermined relationship to said first object and for applying same to said second object, said diffuse beam having a varying intensity from the center to the extremities thereof;
a reflecting target substantially smaller in dimension than the diffuse beam of light mounted on said second object for reflecting a portion of the beam of concentrically patterned light, the intensity of the reflection being indicative of the position of said second object in the diffuse light beam;

a light sensor for receiving the reflection of the target and for providing a signal proportional to its intensity; and control means responsive to the light intensity signal for indicating the locational relationship between the first and second objects.

2. The device according to claim 1 wherein said light source means is further defined as including a light source and a diffusing means for receiving light from said light source and for diffusing it into a diffuse beam of concentrically patterned light.

3. The device according to claim 2 wherein said diffusing means is further defined as means for receiving the light from said light source and for diverging said light to form said diffuse beam of concentrically patterned light.

4. The device according to claim 1 further defined as a device for establishing and maintaining a locational relationship between the objects wherein a drive means is coupled to one of the objects for moving the object and wherein said control means is interposed between said light sensor and said drive means and is responsive to the light intensity signal for causing said drive means to move the object so as to place the target in the center of said beam of said concentrically patterned light.

5. The device according to claim 4 wherein said drive means is further defined as coupled to the second of said objects.

6. The device according to claim 5 wherein said drive means is further defined as moving the second object in said light beam in a plane normal to the beam.

7. The device according to claim 6 wherein said drive means is further defined as moving the second object along mutually perpendicular axes in a plane normal to the light beam.

8. The device according to claim 7 wherein said drive means is coupled to the second object for moving the object in a direction parallel to the light beam, said movement altering the levels of the light intensity signals in accordance with the location of the second object in said parallel direction, and wherein said control means includes means responsive to the levels of the light intensity signals for causing said drive means to move said second object to a desired location along a path parallel to the light beam.

9. The device according to claim 8 wherein said control means includes means for providing a reference signal proportional to a light intensity signal level corresponding to the desired location of the second object along a path parallel to the light beam and a means for comparing said reference signal and said light intensity signal level and providing an error signal to said drive means to cause said drive means to move the second object to the desired location.

10. The device according to claim 7 wherein said drive means moves said second object along coplanar, mutually perpendicular axes normal to the beam and the control means includes means for causing said drive means to move said second object along said pair of axes so as to place the target in the center of said beam of concentric patterned light.

11. The device according to claim 10 wherein said control means is so constructed as to move said second object along one of said axes and thereafter move said second object along the other of said axes.

12. The device according to claim 5 wherein said drive means is further defined as having means for angularly moving said object about at least one axis perpendicular to said beam of light.

13. The device according to claim 12 further including:

a pair of light source means generating oppositely directed, parallel, diffuse beams of concentrically patterned light and for applying same to said second object, said diffuse beams having varying intensities from the centers to the extremities thereof;

a pair of reflecting targets substantially smaller in dimension than the diffuse beams of light mounted on opposite sides of said second object for reflecting portions of the beams of concentrically patterned light, the intensities of the reflections being indicative of the position of said second object in the diffuse light beams;

a pair of light sensors for receiving the reflections of the targets and for providing signals proportional to their intensities; and wherein said control means is further defined as interposed between said light sensors and said drive means for causing said drive means to angularly move said object about an axis perpendicular to said light beams so as to place the targets in center of said beams of concentrically patterned light.

14. The device according to claim 5 including:

a second light source means for generating a second diffuse beam of concentrically patterned light bearing a predetermined orientation with respect to said first light beam and for applying same to said second object, said second diffuse light beam having a varying intensity from the center to the extremities thereof;

said drive means further including means for moving said second object in said second light beam in a plane normal thereto;

a second reflecting target substantially smaller in dimension than said second diffuse beam of light mounted on said second object for reflecting a portion of said second beam of concentrically patterned light, the intensity of the reflection being indicative of the position of said second object in said second light beam;

a second light sensor for receiving the reflection of the second target and for providing a signal proportional to its intensity; and wherein said control means is further defined as interposed between said second light sensor and said drive means and is responsive to the light intensity signal of said second light sensor for causing said drive means to move said second object so as to place the second target in the center of said second beam of concentrically patterned light.

15. The device according to claim 14 wherein said drive means is further defined as angularly moving said object about at least one axis perpendicular to said pair of light beams.

16. The device according to claim 14 wherein said control means includes means responsive to the magnitude of the light sensor signal of said second light sensor for sensing an extreme light intensity light condition thereof and for providing a pulse output and said control means includes said pulse responsive means for operating said drive means.

17. The device according to claim 1 wherein said control means includes means responsive to the magnitude of the light sensor signal for sensing an extreme light intensity condition thereof.

18. The device according to claim 17 wherein said extreme condition sensing means comprises means for providing a pulse output upon sensing an extreme light intensity condition of said signal and said control means includes pulse responsive means for operating said drive means.

19. The device according to claim 18 wherein said control means further includes a pulse responsive bistable logic means coupled to said extreme value sensing means and to said drive means for controlling the direction of movement of said second object in accordance with the pulse output of said extreme value sensing means.

20. The device according to claim 18 wherein said extreme condition sensing means includes a differential amplifier providing an output signal responsive to a reversal of the relative magnitudes of the signals applied to a pair of amplifier input terminals, one of said input terminals receiving said light sensor signal, the other of said input terminals being biased by a capacitor, a diode connected between said input terminals for charging the capacitor and maintaining one input signal relative magnitude condition when the magnitude of the light sensor signal exceeds the capacitor charge and means for discharging the capacitor during a reversed input signal relative magnitude condition when the capacitor charge exceeds the magnitude of the light signal source.

21. The device according to claim 19 wherein said drive means moves said second object along coplanar, mutually perpendicular axis and said control means is so constructed to cause said drive means to move said second object along one of said axes and thereafter move said second object along the other of said axes.

22. The device according to claim 21 wherein said control means includes timer means coupled to the output of the pulse output means for sensing the rapidity of the output pulses for causing said drive means to move said second object along one of said axes and, upon sensing a predetermined rapidity of the output pulses, to move said second object along the other of said axes.

23. A method of establishing and maintaining the position of one object with respect to a second object comprising the steps of:
  placing a reflective target on the second object;
  generating a diffuse beam of concentrically patterned light having a varying intensity from the center to the extremities and having a predetermined orientation with respect to the first object;
  moving the second object into the beam of concentrically patterned light; and
  sensing the magnitude of the light reflected from the target to ascertain the location of the second object.

24. The method according to claim 23 further defined in that the step of sensing the magnitude of the reflected light is further defined as sensing an extreme magnitude of the reflected light.

25. The method according to claim 23 wherein the step of generating a light beam is further defined as generating a second concentrically patterned diffuse light beam having a predetermined orientation with respect to the first light beam, said method being additionally defined as placing a second reflective target on the second object for reflecting the second light beam, moving the second object in the second light beam and sensing the magnitude of the light reflected from the target to ascertain the location of the second object with respect to the second light beam.

26. The method according to claim 23 further including the steps of:
  generating a pair of oppositely directed, parallel diffuse, concentrically patterned light beams;
  placing a pair of reflective targets on opposite sides of the second object;
  placing the second object in the beams of light; and
  angularly moving the second object about at least one axis perpendicular to said beams of light to align the pair of targets with the pair of light beams.

27. The method according to claim 23 wherein the first object comprises a radiation beam emitter and said second object comprises a patient.

28. The method according to claim 23 wherein the step of moving the second object is further defined as moving the second object in the light beam along mutually perpendicular axes in a plane normal to the beam.

29. The method according to claim 28 wherein the step of sensing the magnitude of the reflective light is further defined as sensing the levels of the light intensity signals and the step of moving the second object in the light beam is further defined as moving the second object along a path parallel to the light beam in accordance with levels of light intensity signals.

30. The method according to claim 29 wherein the step of moving the second object is further defined as sequentially moving the second object along one axis and thereafter along another axis.

31. A patient positioner for establishing and maintaining a locational relationship between a radiation beam emitter and a patient containing couch comprising:
  light source means for generating a diffuse beam of concentrically patterned light bearing a predetermined orientation with respect to said radiation beam and for applying same to said patient containing couch, said diffuse beam having a varying intensity from the center to the extremities thereof;
  drive means coupled to the couch for moving the couch in said light beam;
  a reflecting target substantially smaller in dimension than the diffuse beam of light mounted on a patient on the couch for reflecting a portion of the beam of concentrically patterned light, the intensity of the reflection being indicative of the position of the patient in the diffuse light beam;
  a light sensor for receiving the reflection of the target and for providing a signal proportional to its intensity; and
  control means interposed between said light sensor and said drive means and responsive to said signal for causing said drive means to move the couch so as to place the target in the center of said beam of concentrically patterned light, thereby to establish and maintain a locational relationship between the radiation beam and the patient.

32. The patient positioner according to claim 31 wherein said light source means is further defined as including a light source and a diffusing means for receiving light from said light source and for diffusing it into a diffuse beam of concentrically patterned light.

33. The patient positioner according to claim 32 wherein said diffusing means is further defined as means for receiving the light from said light source and for diverging said light to form said diffuse beam of concentrically patterned light.

34. The patient positioner according to claim 31 wherein said drive means is further defined as moving the couch in said light beam along mutually perpendicular axes in a plane normal to the beam.

35. The patient positioner according to claim 34 wherein said drive means is coupled to the couch for moving the couch in a direction parallel to the light beam, said movement altering the levels of the light intensity signals in accordance with the location of the couch in said parallel direction, and wherein said control means includes means responsive to the levels of the light intensity signals for causing said drive means to move the couch to a desired location along a path parallel to the light beam.

36. The patient positioner according to claim 35 wherein said control means includes means for providing a reference signal proportional to a light intensity signal level corresponding to the desired location of the couch along a path parallel to the light beam and a means for comparing said reference signal and said light intensity signal level and providing an error signal to said drive means to cause said drive means to move the couch to the desired location.

37. The patient positioner according to claim 34 wherein said drive means is so constructed as to move the couch along one of said axes and thereafter move the couch along the other of said axes.

38. The patient positioner according to claim 34 including:
a second light source means for generating a second diffuse beam of concentrically patterned light bearing a predetermined orientation with respect to said first light beam, said second diffuse light beam having a varying intensity from the center to the extremities thereof;
said drive means further including means for moving said couch in said second light beam in a plane normal thereto;
a second reflecting target substantially smaller in dimension than said second diffuse beam of light mounted on the patient for reflecting a portion of said second beam of concentrically patterned light, the intensity of the reflection being indicative of the position of the patient in said second light beam;
a second light sensor for receiving the reflection of the second target and for providing a signal proportional to its intensity; and
wherein said control means is further defined as interposed between said second light sensor and said drive means and is responsive to the light intensity signal of said second light sensor for causing said drive means to move said couch so as to place the second target in the center of said second beam of concentrically patterned light.

39. The device according to claim 38 wherein said drive means is further defined as angularly moving the couch about at least one axis perpendicular to said pair of light beams.

40. The patient positioner according to claim 38 wherein said control means includes means responsive to the magnitude of the light sensor signal of said second light sensor for sensing an extreme light intensity light condition thereof and for providing a pulse output and said control means includes said pulses responsive means for operating said drive means.

41. The patient positioner according to claim 31 wherein said drive means is further defined as having means for angularly moving the couch about at least one axis perpendicular to said beam of light.

42. The patient positioner according to claim 41 further including:
a pair of light source means generating oppositely directed, parallel, diffuse beams of concentrically patterned light, said diffuse beams having varying intensities from the centers to the extremities thereof;
a pair of reflecting targets substantially smaller in dimension than the diffuse beams of light mounted on opposite sides of the patient for reflecting portions of the beams of concentrically patterned light, the intensities of the reflections being indicative of the position of the patient in the diffuse light beams;
a pair of light sensors for receiving the reflections of the targets and for providing signals proportional to their intensities; and
wherein said control means is further defined as interposed between said light sensors and said drive means for causing said drive means to angularly move said object about an axis perpendicular to said light beams so as to place the targets in center of said beams of concentrically patterned light.

43. The patient positioner according to claim 31 wherein said control means includes means responsive to the magnitude of the light sensor signal for sensing an extreme light intensity condition thereof and for providing a pulse output upon sensing an extreme light intensity condition of said signal and said control means includes pulse responsive means for operating said drive means.

44. The device according to claim 43 wherein said extreme condition sensing means includes a differential amplifier providing an output signal responsive to a reversal of the relative magnitudes of the signals applied to a pair of amplifier input terminals, one of said input terminals receiving said light sensor signal, the other of said input terminals being biased by a capacitor, a diode connected between said input terminals for charging the capacitor and maintaining one input signal relative magnitude condition when the magnitude of the light sensor signal exceeds the capacitor charge and means for discharging the capacitor during a reversed input signal relative magnitude condition when the capacitor charge exceeds the magnitude of the light signal source.

45. The patient positioner according to claim 43 wherein said drive means, is so constructed as to move the couch along one of said axes and thereafter move the couch along the other of said axes and wherein said control means includes timer means coupled to the output of the pulse output means for sensing the rapidity of the output pulses for causing said drive means to move said second object along one of said axes and, upon sensing a predetermined rapidity of the output pulses, to move said second object along the other of said axes.

46. The patient positioner according to claim 31 wherein said radiation beam emitter includes means for controlling the shape of the radiation beam.

47. The patient positioner according to claim 46 wherein said radiation beam control means includes radiation absorbing blocks replaceably inserted in the path of said radiation beam.

48. The patient positioner according to claim 47 wherein said radiation emitter has a spring loaded shelf extending from a wall thereof for retaining said radiation adsorbing blocks in said radiation beam, said spring loaded shelf being retractable into said wall for removing said radiation absorbing blocks.

49. The patient positioner according to claim 31 wherein said radiation emitter has a means for removably affixing the light source thereto.

50. The patient positioner of claim 49 wherein said radiation emitter has a slot and said affixing means has an expandible flange insertable into said slot to affix said light source.

51. The patient positioner of claim 50 wherein said flange includes a pair of relatively movable members having ramp surfaces for providing the expansion upon relative movement.

\* \* \* \* \*